United States Patent [19]

Delserro

[11] Patent Number: 5,468,006
[45] Date of Patent: Nov. 21, 1995

[54] MANUAL GOLF CART

[76] Inventor: Robert J. Delserro, 215 Smith Manor Blvd., West Orange, N.J. 07052

[21] Appl. No.: 314,136
[22] Filed: Sep. 28, 1994
[51] Int. Cl.$^6$ .................... B62J 7/02; B62J 11/00
[52] U.S. Cl. .................... 280/202; 280/282; 280/62; 280/DIG. 6
[58] Field of Search .................... 280/DIG. 5, DIG. 6, 280/202, 204, 282, 651, 62

[56] References Cited

U.S. PATENT DOCUMENTS

| D. 331,085 | 11/1992 | Beyer | D21/191 |
| 4,088,250 | 5/1978 | Schaefer | 224/5 W |
| 4,387,836 | 6/1983 | Laesch | 224/32 A |
| 4,431,205 | 2/1984 | Speicher et al. | 280/62 X |
| 5,106,001 | 4/1992 | Figinski | 224/31 |
| 5,249,822 | 10/1993 | Wu | 280/DIG. 6 X |
| 5,351,983 | 10/1994 | Descalo | 280/DIG. 6 X |
| 5,387,010 | 2/1995 | Mohr | 280/DIG. 5 X |

Primary Examiner—Margaret A. Focarino
Assistant Examiner—Victor E. Johnson

[57] ABSTRACT

A golf cart for transporting a golfer and golf clubs about a golf course. The inventive device includes a manually powered cycle having a steerable front wheel and a pair of rear wheels. A golf bag holding assembly is secured to the cycle between the rear wheel for supporting and securing a golf bag. A drink holder and writing pad are also secured to the cycle for holding a beverage and a golf scorecard, respectively.

1 Claim, 4 Drawing Sheets

MANUAL GOLF CART

BACKGROUND OF THE INVENTION

1. Field of the Invention

The present invention relates to movable conveyance structures and more particularly pertains to a manual golf cart for transporting an individual and golfing equipment about a golf course.

2. Description of the Prior Art

The use of movable conveyance structures is known in the prior art. More specifically, movable conveyance structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art movable conveyance structures include U.S. Pat. Nos. 4,966,381; 4,792,149; 4,770,326; 4,431,205; and 3,827,613.00

While these devices fulfill their respective, particular objectives and requirements, the aforementioned patents do not disclose a golf cart for transporting a user and associated golfing equipment about a golf course which includes a manually powered cycle having a steerable front wheel and a pair of rear wheels with a golf bag holding assembly secured to the cycle between the rear wheels for supporting and securing a golf bag. Furthermore, none of the known prior arts movable conveyance structures teach or suggest a manual golf cart of the aforementioned structure which further includes a drink holder and writing pad secured to the cycle for holding a beverage and a golf scorecard, respectively.

In these respects, the manual golf cart according to the present invention substantially departs from the conventional concepts and designs of the prior art, and in so doing provides an apparatus primarily developed for the purpose of transporting an individual and associated golfing equipment about a golf course.

SUMMARY OF THE INVENTION

In view of the foregoing disadvantages inherent in the known types of movable conveyance structures now present in the prior art, the present invention provides a new manual golf cart construction wherein the same can be utilized for transporting a golfer and golfing equipment. As such, the general purpose of the present invention, which will be described subsequently in greater detail, is to provide a new manual golf cart apparatus and method which has many of the advantages of the movable conveyance structures mentioned heretofore and many novel features that result in a manual golf cart which is not anticipated, rendered obvious, suggested, or even implied by any of the prior art movable conveyance structures, either alone or in any combination thereof.

To attain this, the present invention generally comprises a golf cart for transporting a golfer and golf clubs about a golf course. The inventive device includes a manually powered cycle having a steerable front wheel and a pair of rear wheels. A golf bag holding assembly is secured to the cycle between the rear wheels for supporting and securing a golf bag. A drink holder and writing pad are also secured to the cycle for holding a beverage and a golf scorecard, respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new manual golf cart apparatus and method which has many of the advantages of the movable conveyance structures mentioned heretofore and many novel features that result in a manual golf cart which is not anticipated, rendered obvious, suggested, or even implied by any of the prior art movable conveyance structures, either alone or in any combination thereof.

It is another object of the present invention to provide a new manual golf cart which may be easily and efficiently manufactured and marketed.

It is a further object of the present invention to provide a new manual golf cart which is of a durable and reliable construction.

An even further object of the present invention is to provide a new manual golf cart which is susceptible of a low cost of manufacture with regard to both materials and labor, and which accordingly is then susceptible of low prices of sale to the consuming public, thereby making such manual golf carts economically available to the buying public.

Still yet another object of the present invention is to provide a new manual golf cart which provides in the apparatuses and methods of the prior art some of the advantages thereof, while simultaneously overcoming some of the disadvantages normally associated therewith.

Still another object of the present invention is to provide a new manual golf cart for transporting a golfer and golf clubs about a golf course.

Yet another object of the present invention is to provide a new manual golf cart which includes a manually powered cycle having a steerable front wheel and a pair of rear wheels with a golf bag holding assembly secured to the cycle between the rear wheels for supporting and securing a golf bag.

Even still another object of the present invention is to provide a new manual golf cart of the aforementioned structure which further includes a drink holder and a writing pad secured to the cycle for holding a beverage and a golf scorecard, respectively.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
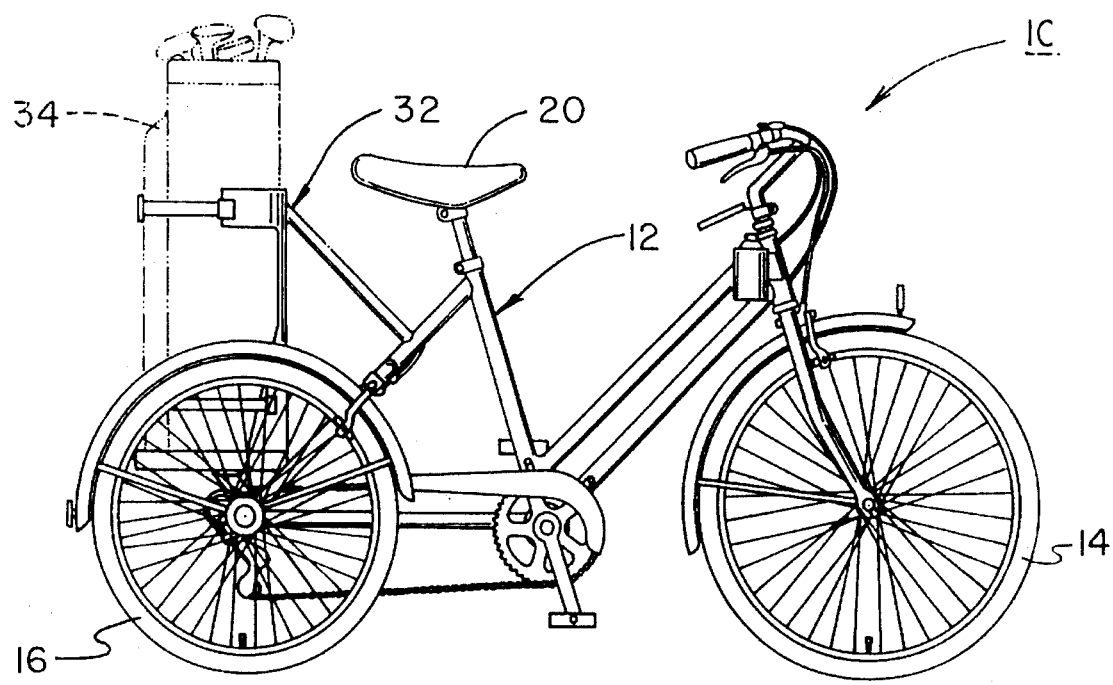
FIG. 1 is a side elevation view of a manual golf cart according to the present invention.

With reference now to the drawings, and in particular to FIGS. 1–8 thereof, a new manual golf cart embodying the principles and concepts of the present invention and generally designated by the reference numeral 10 will be described.

Figure 2:
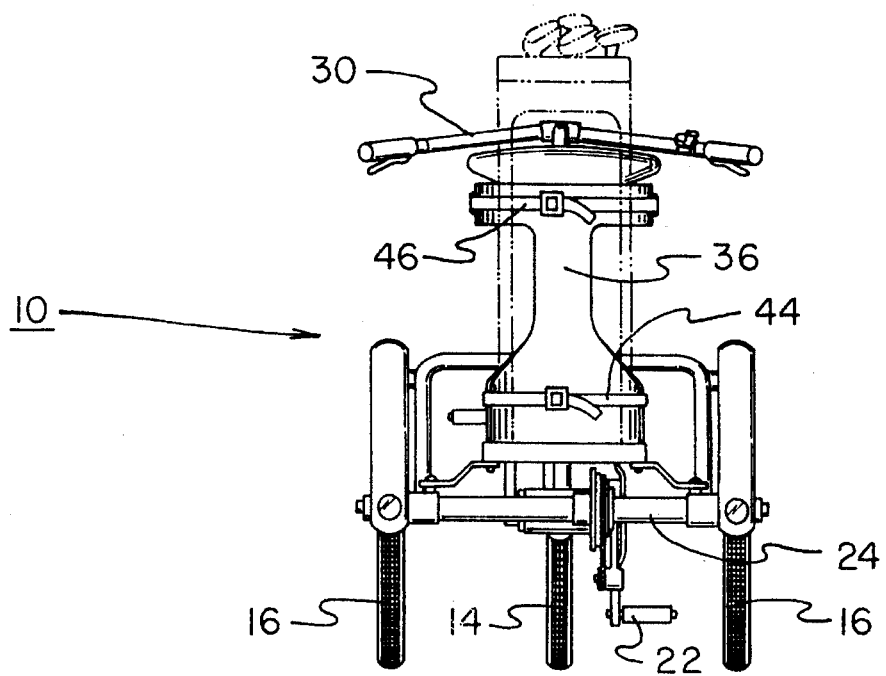
FIG. 2 is a rear elevation view thereof.
Figure 3:
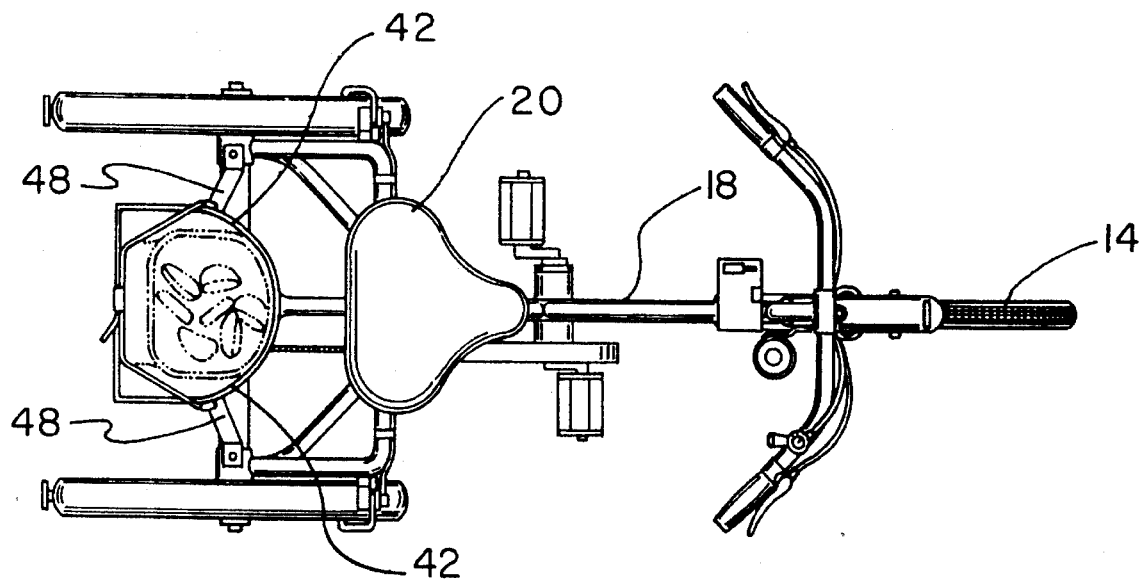
FIG. 3 is a top plan view of the invention.
Figure 4:
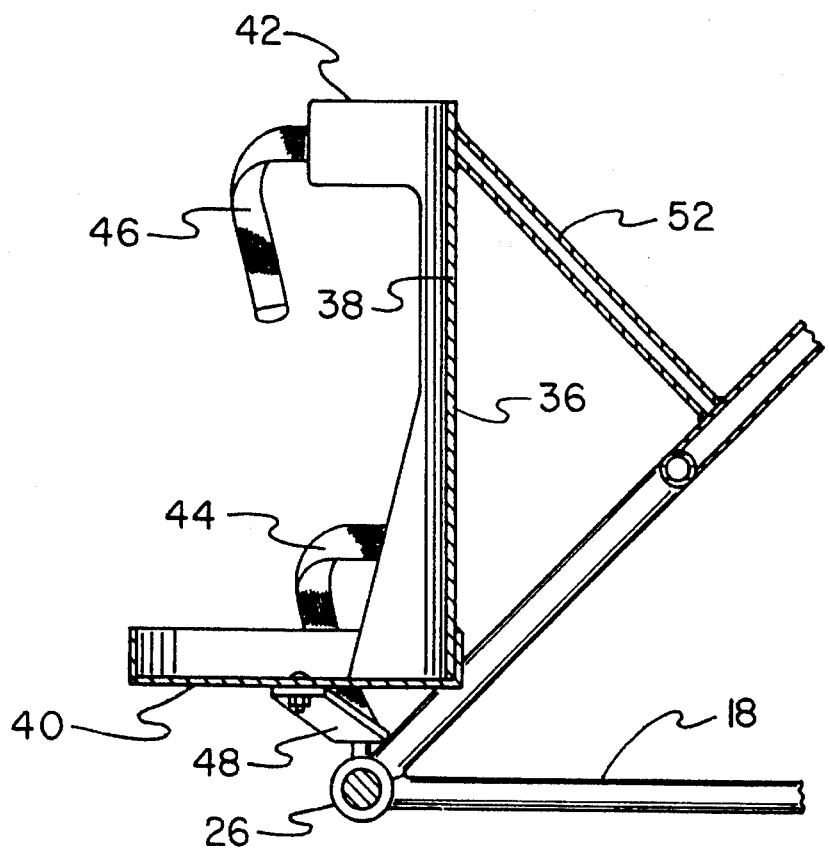
FIG. 4 is a side elevation view, partially in cross section, of a portion of the present invention.
Figure 5:
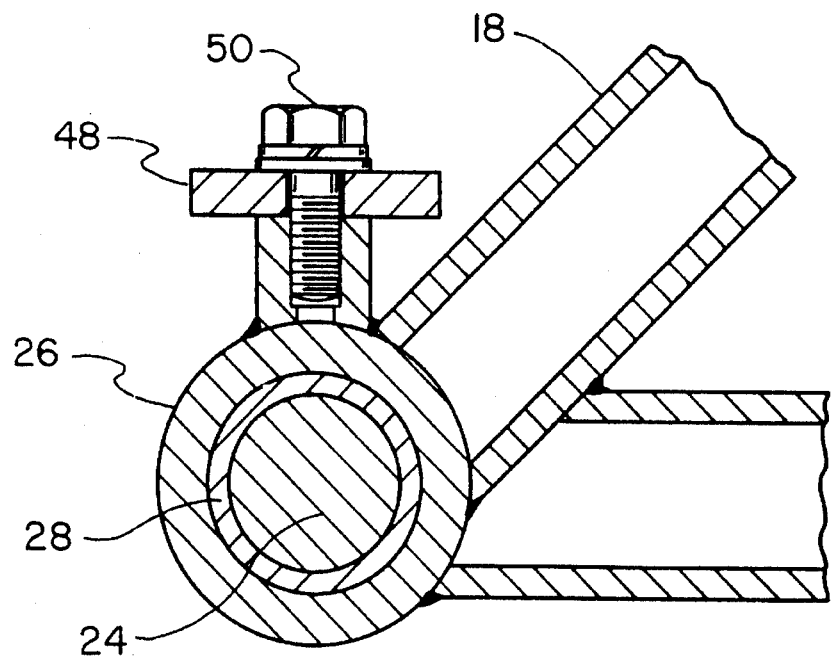
FIG. 5 is an enlarged cross sectional illustration of an axle mount of the invention.

More specifically, it will be noted that the manual golf cart 10 comprises a cycle 12 including a steerable front wheel 14 and a pair of spaced rear wheels 16 rotatably mounted to a frame 18, as shown in FIGS. 1–3. A seat 20 is mounted to a portion of the frame 18 and is operable to receive and support an individual thereon. A pedal assembly 22 is rotatably coupled to the frame 18, as shown in FIG. 2, and mechanically coupled by an unlabeled chain to a rear wheel shaft 24 to which the spaced rear wheels 16 are mounted. A plurality of unlabeled gears are mounted to the rear wheel shaft 24, with a derailleur being engaged to the chain and selectively operable to position the chain over a desired one of the gears in a conventional manner. As shown in FIG. 5, the frame 18 includes a pair of spaced axle mounts 26 each having a bearing 28 to rotatably support the rear wheel shaft 24 relative to the frame. To effect steering of the cycle 12, a handle bar 30 extends through a portion of the frame 18 and is operable to effect steering rotation of the front wheel 14 about a somewhat vertical axis.

As shown in FIGS. 1–4, the present invention 10 includes a golf bag holding means 32 for supporting and securing a golf bag 34 relative to the cycle 12. To this end, the golf bag holding means 32 comprises a substantially semi-cylindrical member 36 having a reduced center portion 38 extending upwardly from a flat base member 40. The reduced center portion 38 terminates at an upper distal end thereof in a pair of arcuate lateral arms 42 which extend at least partially about the golf bag 34 when the same is positioned within the golf bag holding means 32. A lower strap 44 is coupled to the semi-cylindrical member 36 proximal to the flat base member 40 and can be extended about the golf bag 34 to secure the same to the golf bag holding means 32. Similarly, an upper strap 46 extends from the arcuate lateral arms 42 and can be selectively coupled about the golf bag 34 to further secure the same to the golf bag holding means 32. The semi-cylindrical member 36 is secured to the frame 18 of the cycle 12 by a pair of support brackets 48 which extend from the flat base member 40 outwardly to engage the axle mounts 26 on respectively opposed sides of the golf bag holding means 32. As shown in FIG. 5, a threaded fastener 50 extends through the support bracket 48 to secure the bracket to the respective axle mount 26 of the frame 18. The golf bag holding means 32 is further secured by a brace member 52 which extends between the frame 18 and an upper portion of the semi-cylindrical member 36 between the arcuate lateral arms 42. By this structure, the golf bag holding means 32 permits an associated golf bag 34 to be securely coupled to the cycle 12 for transport about a golf course or the like.

Figure 6:
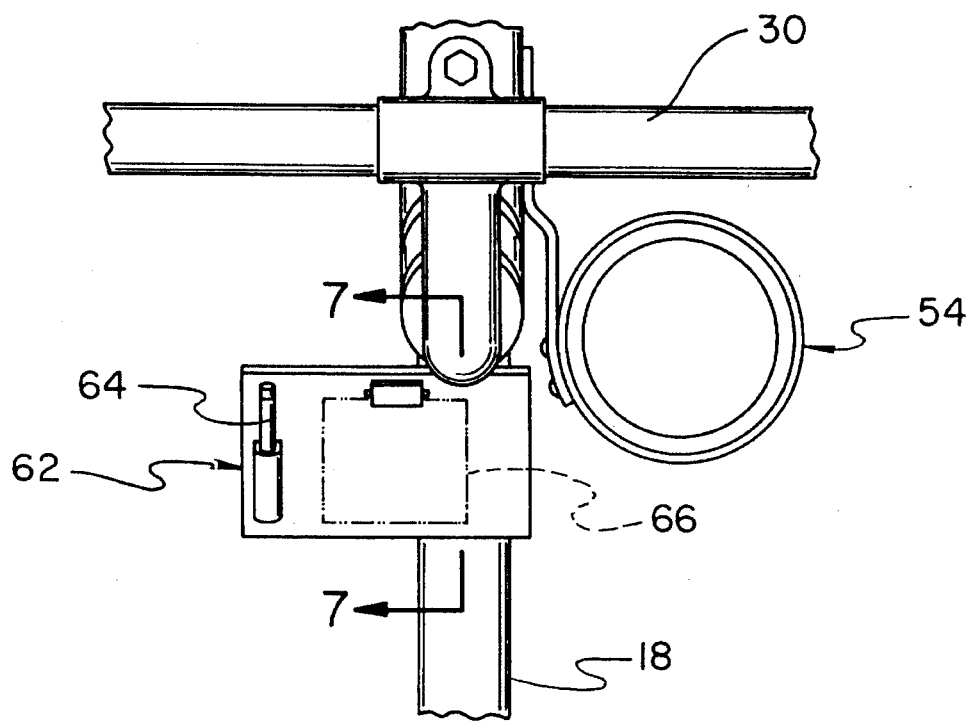
FIG. 6 is an enlarged top plan view of a portion of the present invention.
Figure 8:
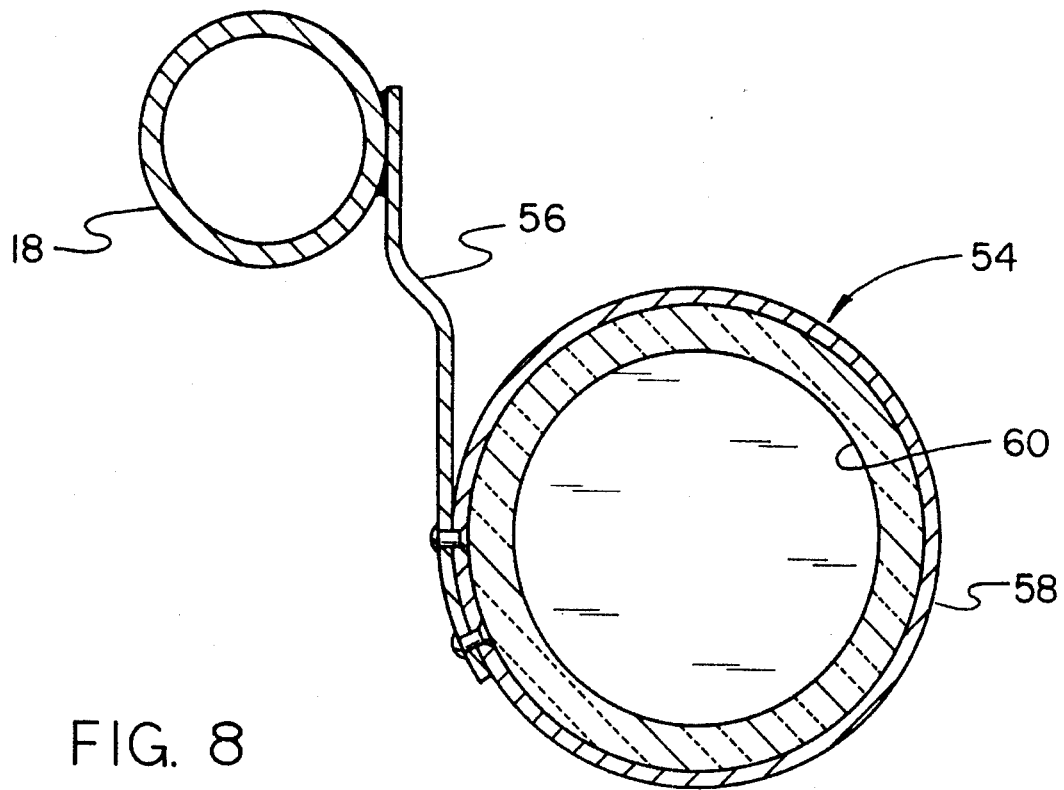
FIG. 8 is a cross sectional view of a drink holding means comprising a portion of the present invention.

Referring now to FIGS. 6 and 8, it can be shown that the manual golf cart 10 of the present invention further comprises a drink holding means 54 for supporting a beverage container relative to the frame 18 of the cycle 12. To this end, the drink holding means 54 preferably comprises an extension bracket 56 fixedly secured to a forwardmost portion of the frame 18. The extension bracket 56 extends from the frame 18 and is fixedly secured to a closed bottom cylinder 58 having interior insulation 60 extending coextensively about an interior side wall surface of the closed bottom cylinder, whereby a beverage and or the like can be frictionally received within the cylinder and retained therein.

Figure 7:
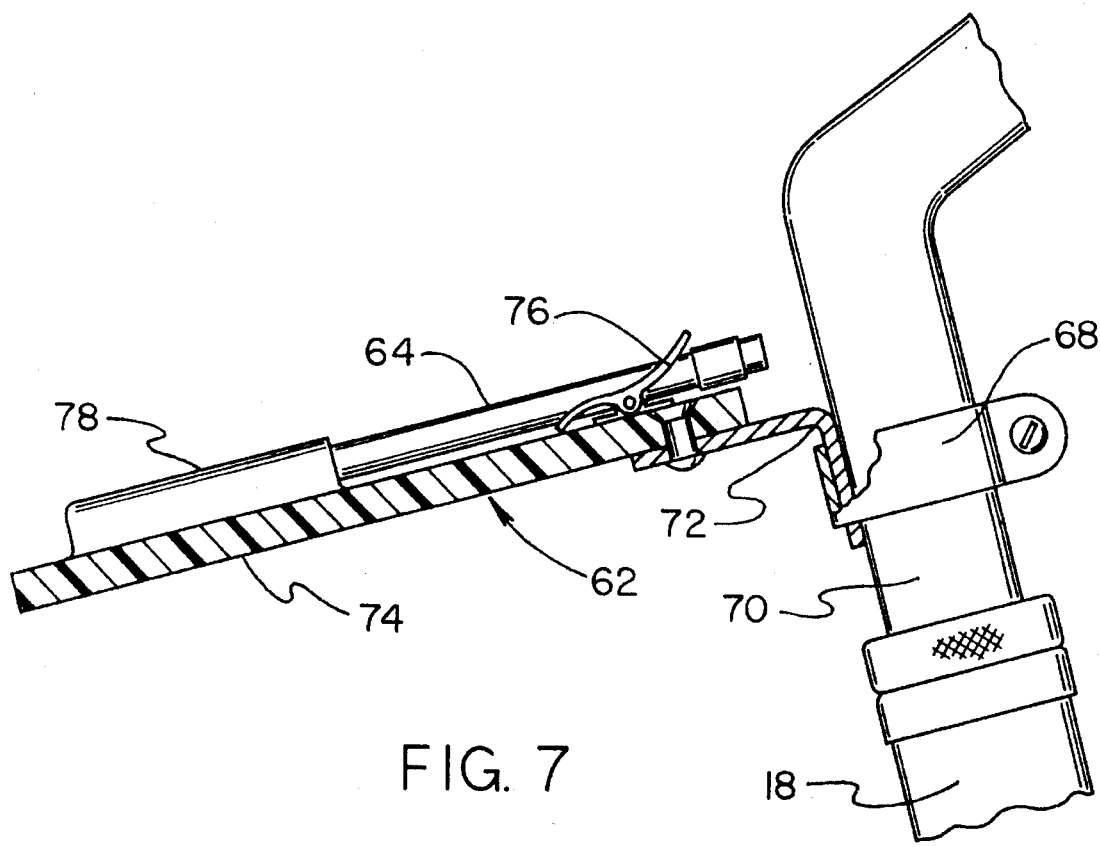
FIG. 7 is a cross sectional view taken along line 7—7 of FIG. 6.

Referring now to FIG. 7 with concurrent reference to FIG. 6, it can be shown that the manual golf cart further comprises a writing pad means 62 for supporting a writing instrument 64 and a scorecard 66 relative to the frame 18 of the cycle 12. The writing pad means 62 of the present invention 10 preferably comprises a cylindrical clamp 68 secured about a handle bar neck 70 of the handle bar 30. An L-bracket 72 extends from the cylindrical clamp 68 and is secured to a planar member 74 so as to support the planar member in a substantially orthogonal orientation relative to the handle bar neck 70. The planar member 74 includes a substantially flat top surface upon which the scorecard 66 can be retained by a spring loaded clip 76, and further includes a pocket 78 for receiving and securing the writing instrument 64 thereto. Because the writing pad means 62 is coupled to the handle bar neck 70, the planar member 74 can be rotatably positioned relative to the frame 18 of the cycle 12 through a rotation of the handle bar 30, whereby a writing procedure can be accomplished on either side of the manual golf cart 10. In other words, an individual residing on a left side of the manual golf cart 10 can rotate the handle bar 30 to the right so as to position the writing pad means 62 in a proximal position relative to the individual. Such movable positioning of the writing pad means 62 provides for ease of score keeping during a golf game or the like.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A manual golf cart comprising:

a cycle including a frame having a pair of spaced axle mounts; a steerable front wheel mounted to said frame; a rear wheel shaft rotatably mounted to said axle mounts of said frame; a pair of spaced rear wheels mounted to opposed ends of said rear wheel shaft; a pedal assembly rotatably coupled to said frame and mechanically coupled to said rear wheel shaft; and a handle bar extending through a portion of said frame to effect steering rotation of said front wheel;

a golf bag holding means for supporting and securing a golf bag relative to said cycle, said golf bag holding means comprising a substantially semi-cylindrical member having a reduced center portion extending upwardly from a flat base member, the flat base member being formed in a planar generally circular configuration positioned horizontally between the rear wheels of the cycle, the flat base member adapted to retain golf clubs and other golf related accessories thereupon, said reduced center portion terminating at an upper distal end thereof in a pair of arcuate lateral arms; a lower strap coupled to said semi-cylindrical member proximal to said flat base member thereof; and an upper strap extending from a first one of said arcuate lateral arms to be selectively coupled to a second one of said lateral arms, said semi-cylindrical member of said golf bag holding means being secured to said frame of said cycle by a pair of support brackets which extend from said flat base member outwardly to engage said axle mounts on respectively opposed sides of said golf bag holding means;

a brace member extending between said frame and an upper portion of said semi-cylindrical member between said arcuate lateral arms, the brace member extending perpendicularly from the frame and maintaining the golf bag holding means in a vertical orientation;

a drink holding means for supporting a beverage container relative to said frame of said cycle, said drink holding means comprising an extension bracket fixedly secured to a forwardmost portion of said frame; a closed bottom cylinder fixedly secured to said extension bracket; and interior insulation extending coextensively about an interior side wall surface of said closed bottom cylinder; and, a writing pad means for supporting a writing instrument and a scorecard relative to said frame of said cycle, said writing pad means comprising a cylindrical clamp secured about a portion said handle bar; an L-bracket secured to said cylindrical clamp and extending therefrom; a planar member coupled to a distal end of said L-bracket and supported thereby; said planar member including a substantially flat top surface; a spring loaded clip coupled to said flat top surface of said planar member; and a pocket secured to said flat top surface of said planar member for receiving and securing said writing instrument thereto, wherein said handle bar can be rotated to position said writing pad means laterally of said cycle.

* * * * *